(12) United States Patent
No et al.

(10) Patent No.: US 11,970,234 B2
(45) Date of Patent: Apr. 30, 2024

(54) ELECTRIC BICYCLE THEFT DETECTION SYSTEM AND ELECTRIC BICYCLE THEFT DETECTION METHOD

(71) Applicant: HL KLEMOVE CORP., Incheon (KR)

(72) Inventors: Eun Jung No, Gyeonggi-do (KR); Bumrae Cho, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 77 days.

(21) Appl. No.: 17/886,470

(22) Filed: Aug. 12, 2022

(65) Prior Publication Data

US 2023/0114523 A1 Apr. 13, 2023

(30) Foreign Application Priority Data

Oct. 13, 2021 (KR) .................. 10-2021-0136085

(51) Int. Cl.
*B62H 5/20* (2006.01)
*B62M 6/50* (2010.01)

(52) U.S. Cl.
CPC .................. *B62H 5/20* (2013.01); *B62M 6/50* (2013.01)

(58) Field of Classification Search
CPC ... B62H 5/20; B62M 6/50; B62M 6/40; B62J 45/411; B62J 45/413; B62J 50/22; G06Q 50/10
See application file for complete search history.

(56) References Cited

U.S. PATENT DOCUMENTS

2016/0221627 A1\* 8/2016 Hines ........................ B62J 6/056
2020/0108882 A1\* 4/2020 Weigel ..................... B62M 6/45

\* cited by examiner

*Primary Examiner* — Omeed Alizada
(74) *Attorney, Agent, or Firm* — Ladas & Parry, LLP

(57) ABSTRACT

According to an embodiment of the present invention, An electric bicycle theft detection system includes: a pedal; a pedal rotation speed detector configured to measure a rotation speed of the pedal; a driving wheel configured to rotate by receiving power; a motor configured to rotate the driving wheel; a driving wheel rotation speed detector configured to measure the rotation speed of the driving wheel; a control device configured to detect theft based on the rotation speed of the pedal, a torque of the motor, and the rotation speed of the driving wheel; and a user interface device configured to generate a warning signal when the control device detects the theft.

17 Claims, 8 Drawing Sheets

ELECTRIC BICYCLE THEFT DETECTION SYSTEM AND ELECTRIC BICYCLE THEFT DETECTION METHOD

TECHNICAL FIELD

The present disclosure relates to an electric bicycle theft detection system and an electric bicycle theft detection method, and more particularly, to an electric bicycle theft detection system and an electric bicycle theft detection method capable of detecting theft of an electric bicycle and generating a warning signal to warn a user.

BACKGROUND

In general, as one of the means of short-distance transportation, a bicycle is widely used for exercise or hobbies for the purpose of health and the like. In recent years, electric bicycles in which a motor is installed to travel with a driving force of a motor in order to travel a long distance or reduce a user's physical exertion have been widely distributed. The electric bicycle is configured to assist in traveling with power of a motor by detecting when a driver turns a pedal by attaching a battery and a motor to a bicycle that may move only by the existing manpower. To this end, in addition to the motor and the battery, the electric bicycle further includes a reducer for reducing a rotational force of the motor, a power transmission device for transmitting the rotational force output from the reducer to wheels, and a control device for controlling the reducer and the power transmission device.

In addition, in the electric bicycle, a user may manipulate and control the rotational force of the motor through the control device. However, the electric bicycle further includes a speed sensor installed to detect a rotation speed of the pedal or a torque sensor installed in the motor in order to control the driving of the motor more precisely by detecting a user's pedal force when riding on a ramp such as an uphill incline or a downhill incline.

In addition, the electric bicycle is divided into a pedal assist system (PAS) method and a throttle method according to a driving method.

The PAS method is a method of operating a motor by detecting when a user steps on a pedal by a sensor installed on the pedal, etc. Most of the PAS methods are designed to set steps from supporting low power to supporting high power. As the PAS methods, there are a speed sensor method that detects a rotation of a pedal and transmits power, and a torque sensor method that detects a pressure of a pedal, a rotation of the pedal, and the number of revolutions. The speed sensor method is inexpensive but has a sense of difference in driving feeling, and the torque sensor method recognizes a user's pedal torque, and thus, has a relatively little sense of difference from a bicycle.

The throttle method is a method of riding a bicycle like a motorcycle without having to roll a pedal by operating a button or lever mounted on a handlebar.

In addition, electric bicycles without chains are also appearing. As such, the electric bicycles without chains move by converting power from a user stepping on a pedal into electricity by a generator connected to the pedal, storing the electricity in a battery, and turning a motor the electricity stored in the battery. In this type of electric bicycle, it is possible to improve acceleration performance of the electric bicycle by controlling the motor to be suitable for the driving environment, implement an automatic shift function by adjusting a gear ratio of the rotation speed of the pedal and the rotation speed of the driving wheel, and amplify a force that a user transmits to the pedal according to an intuitive ratio.

Meanwhile, electric bicycles are relatively expensive, and when stolen, users may suffer great material damage. Therefore, there is a need for a technology that detects theft of an electric bicycle and helps a user to respond quickly.

SUMMARY

In view of the above, the present disclosure provides a bicycle theft detection system that detects theft and promptly notifies a user that theft has occurred.

In addition, the present disclosure provides a bicycle theft detection method that detects theft and promptly notifies a user that theft has occurred.

According to embodiments of the present disclosure, an electric bicycle theft detection system includes: a pedal configured to generate rotational energy; a pedal rotating speed detector configured to measure a rotating speed of the pedal; a driving wheel configured to rotate by receiving power; a motor configured to rotate the driving wheel; a driving wheel rotating speed detector configured to measure the rotating speed of the driving wheel; a control device configured to detect theft based on the rotating speed of the pedal, a torque of the motor, and the rotating speed of the driving wheel; and a user interface device configured to generate a warning signal when the control device detects the theft.

The control device may detect the theft when the rotating speed of the pedal and the torque of the motor are 0 and the rotation of the driving wheel is measured.

The electric bicycle theft detection system may further include: at least one of a gyro sensor detecting an operation state and a global positioning system (GPS) tracking a position. The control device may detect the theft by reflecting on information provided by the gyro sensor or the global positioning system.

The control device may detect the theft when the gyro sensor detects an operation or the global positioning system detects a location movement while the rotating speed of the pedal, the rotating speed of the driving wheel, and the torque of the motor are 0.

The control device may control the user interface device to generate a warning signal when a preset reference time elapses in a state in which the theft is detected.

According to embodiments of the present disclosure, an electric bicycle theft detection system includes: an electric bicycle including a pedal configured to generate rotational energy, a pedal rotating speed detector configured to measure a rotating speed of the pedal, a driving wheel configured to rotate by receiving power, a motor configured to rotate the driving wheel, a driving wheel rotating speed detector configured to measure the rotating speed of the driving wheel, a control device configured to detect theft based on the rotating speed of the pedal, a torque of the motor, and the rotating speed of the driving wheel, and a modem terminal configured to transmit theft detection information provided by the control device; a mobile terminal installed with an application for managing the electric bicycle and displaying the theft detection information; and a cloud service configured to receive the theft detection information transmitted from the modem terminal, update stored information, and transmit the updated information to the mobile terminal.

The cloud server may include: a web application server configured to communicate with the modem terminal of the electric bicycle; a database server configured to integrate and store information collected by the web application server; and an application programming interface gateway configured to transmit information stored in the database server to the mobile terminal.

The control device may detect the theft when the rotation of the driving wheel is measured while the rotating speed of the pedal and the torque of the motor are 0.

The electric bicycle theft detection system may further include: at least one of a gyro sensor detecting an operation state and a global positioning system (GPS) tracking a position. The control device may detect the theft by reflecting on information provided by the gyro sensor or the global positioning system.

The control device may detect the theft when the gyro sensor detects an operation or the global positioning system detects a location movement while the rotating speed of the pedal, the rotating speed of the driving wheel, and the torque of the motor are 0.

The control device may transmit the theft detection information to the cloud service through the modem terminal when a preset reference time elapses in a state in which the theft is detected.

The electric bicycle may further include a user interface device for generating a warning signal when the control device detects the theft.

According to embodiments of the present disclosure, an electric bicycle theft detection method using an electric bicycle theft detection system includes: measuring a rotating speed of a pedal: measuring a rotating speed of a driving wheel; measuring a torque of a motor rotating the driving wheel; detecting theft based on the rotating speed of the pedal, the rotating speed of the driving wheel, and the torque of the motor; and generating a warning signal to warn a user when the theft is detected.

In the detecting of the theft, the theft may be detected when the rotation of the driving wheel is measured while the rotating speed of the pedal and the torque of the motor are 0.

The electric bicycle theft detection method may further include: detecting an operating through a gyro sensor or tracking a location through a global positioning system (GPS). The theft may be detected by reflecting on information provided by the gyro sensor or the global positioning system.

In the detecting of the theft, the theft may be detected when the gyro sensor detects an operation or the global positioning system detects a location movement while the rotating speed of the pedal, the rotating speed of the driving wheel, and the torque of the motor are 0.

In the warning of the user, a warning signal may be generated when a preset reference time elapses in a state in which the theft is detected.

According to an embodiment of the present disclosure, an electric bicycle tire management system can effectively diagnose a condition of a tire.

According to an embodiment of the present disclosure, a method for diagnosing a tire condition of an electric bicycle may effectively diagnose the condition of the tire.

DETAILED DESCRIPTION

Figure 1:
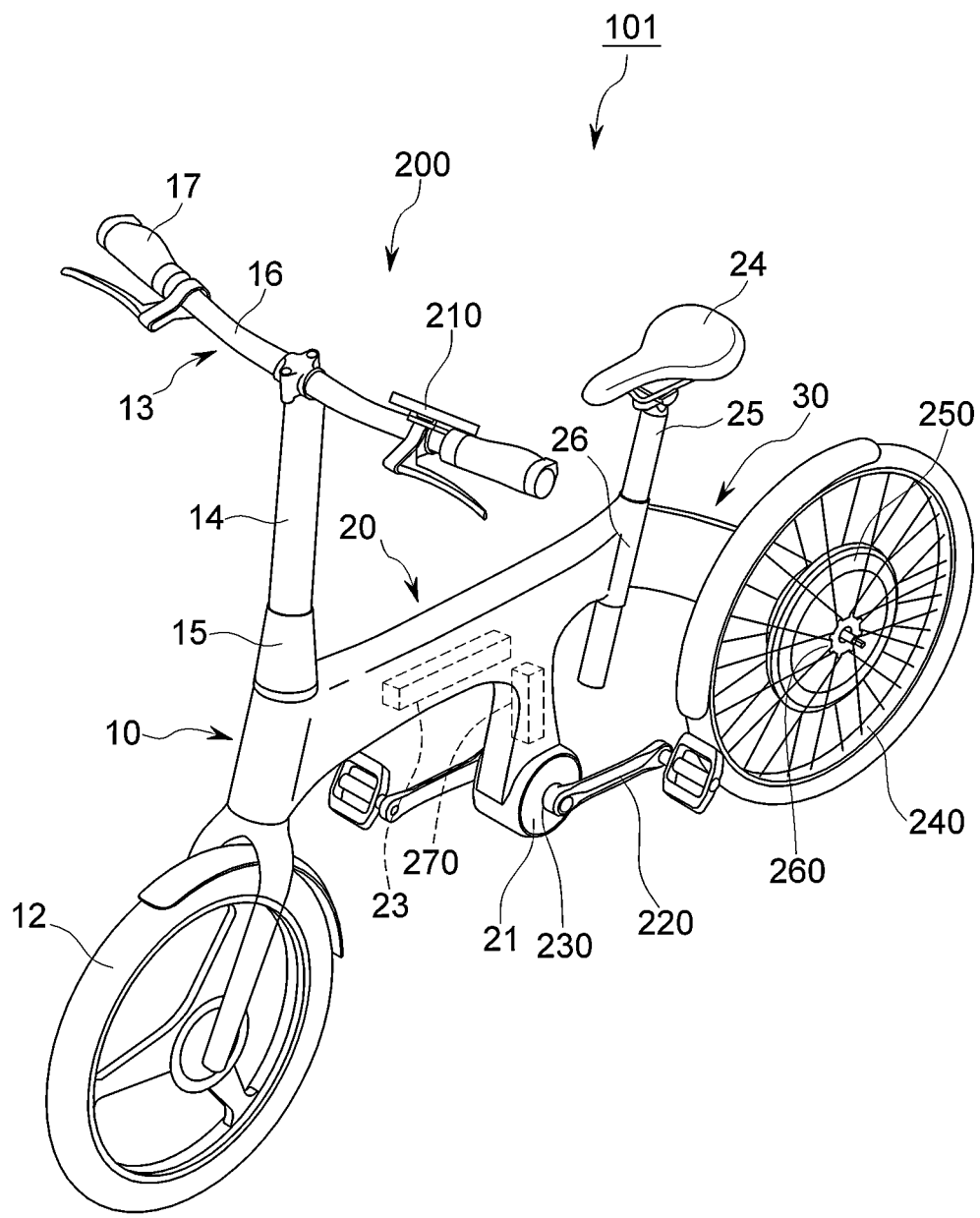
FIG. 1 is a perspective view of an electric bicycle to which an electric bicycle theft detection system according to a first embodiment of the present disclosure is applied.

Hereinafter, embodiments of the present disclosure will be described in detail with reference to the accompanying drawings so that those skilled in the art to which the present disclosure pertains may easily practice the present disclosure. However, the disclosure may be implemented in various different forms, and is not limited to the embodiments described herein.

In addition, in several embodiments, components having the same configuration will be representatively described using the same reference numerals in a first embodiment, and only components different from those of the first embodiment will be described in a second embodiment.

Note that drawings are schematic and not drawn to scale. Relative dimensions and proportions of parts in the drawings are illustrated exaggerated or reduced in size for clarity and convenience in the drawings, and any dimensions are illustrative only and are not limited. The same reference numerals are used to denote like features to the same structures, elements, or parts appearing in two or more drawings.

An embodiment of the present disclosure specifically represents an ideal embodiment of the present disclosure. As a result, various modifications to the diagram are expected. Accordingly, the embodiment is not limited to a specific form of the illustrated area, and includes, for example, a deformation of the form by manufacturing.

Hereinafter, an electric bicycle theft detection system 101 according to a first embodiment of the present disclosure will be described with reference to FIGS. 1 and 2.

Figure 2:
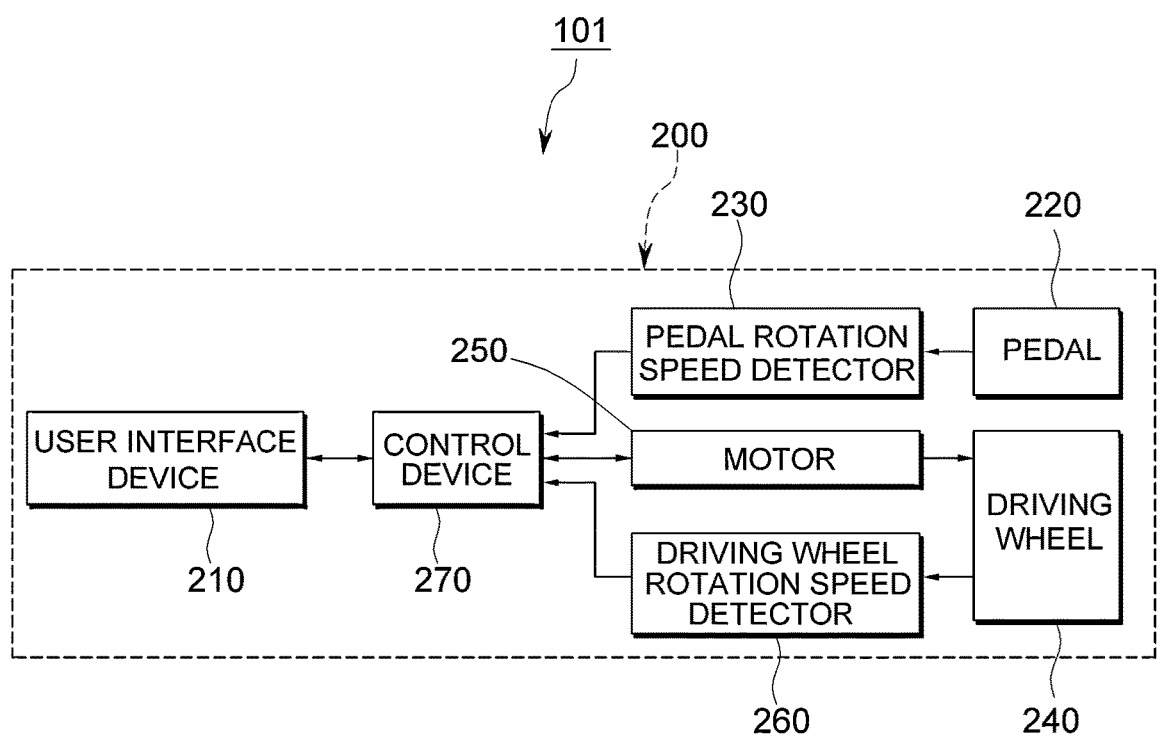
FIG. 2 is a configuration diagram illustrating the electric bicycle theft detection system of FIG. 1.

FIG. 1 illustrates an electric bicycle 200 to which an electric bicycle theft detection system 101 according to a first embodiment of the present disclosure is applied by way of example. FIG. 1 illustrates an electric bicycle 200 without a chain as an example, but a person skilled in the art may apply the present invention to other electric bicycles driven by chains with appropriate modifications and variations.

As illustrated in FIG. 1, the electric bicycle 200 to which the electric bicycle theft detection system 101 is applied may include a front frame 10, a middle frame 20, and a rear frame 30.

The front frame 10 may include a front wheel 12 and a handle stay 14 to which the handle unit 13 is connected.

The handle unit 13 includes a handle stem 15 coupled to the lower end of the handle stay 14, a handle bar 16 coupled to the handle stay 14, and a handle grip 17 installed on the handle bar 16.

The handle stem 15 may be provided to adjust a height of the handle unit 13, and the handle bar 16 may be provided to determine steering of a bicycle.

In addition, the handle grip 17 is provided with a user interface device 210 that displays a state of the electric bicycle 200 to a user and transmits a user's request to the control device 270 through a button or a display. The user interface device 210 may be electrically connected to the control device 270 through a wired or wireless manner. Also, the user interface device 210 may generate a warning signal. Here, the warning signal may include a warning sound warning theft in a loud sound in the surroundings.

A generator 21 is provided at one end of the middle frame 20, and pedals 220 may be rotatably mounted on both sides of the generator 21. When the user rotates the pedal 220, that is, when the pedal 220 generates rotational energy, the rotational energy of the pedal 220 may be converted into electrical energy in the generator 21, and the electrical energy of the generator 21 may be stored in the battery 23 provided in the frame 20.

In addition, the middle frame 20 may further include a saddle tube 25 for installing a saddle 24. The saddle tube 25 is height-adjustably coupled to the seat tube 26 protruding from the rear of the middle frame 20.

A rear wheel 240 is rotatably mounted to an end portion of the rear frame 30 A motor 250 for advancing the electric bicycle 200 by rotating the rear wheel 240 is mounted at the center of the rear wheel 240. That is, the rear wheel 240 becomes the driving wheel. However, the rear wheel 240 is not necessarily the driving wheel, and when the motor is mounted on the front wheel 12, the front wheel 12 may be the driving wheel. As such, a wheel rotating by receiving power among the front wheel 12 and the rear wheel 240 may be the driving wheel. Hereinafter, in the present specification, the rear wheel 240 is referred to as a driving wheel.

Meanwhile, the positions of the battery 23 and the control device 270 are not limited thereto, and may be built in the rear frame 30 instead of the middle frame 20.

The pedal rotation speed detector 230 may measure the rotation speed of the pedal. For example, the pedal rotation speed detector 230 may be installed on a rotation shaft of the pedal 220.

The driving wheel rotation speed detector 260 may measure the rotation speed of the driving wheel 240. For example, the driving wheel rotation speed detector 260 may be installed on a rotation shaft of the driving wheel 240.

The electric bicycle theft detection system 101 according to the first embodiment of the present disclosure includes a pedal 220, a pedal rotation speed detector 230, a driving wheel 240, a motor 250, a driving wheel rotation speed detector 260, a control device 270, and a user interface device 210 among various components of the electric bicycle 200 described above.

In addition, in the first embodiment of the present disclosure, the torque of the motor 250 may be measured by a torque sensor mounted on the motor 250 or indirectly calculated by measuring a current applied to the motor 250.

The control device 270 may detect theft based on the rotation speed of the pedal 220, the torque of the motor 250, and the rotation speed of the driving wheel 240.

Specifically, when the rotation of the driving wheel 240 is measured while the rotation speed of the pedal 220 and the torque of the motor 250 are 0, the control device 270 may detect theft, and when a preset reference time has elapsed in a state in which the theft is detected, the control device 270 may control the user interface device 210 to generate a warning signal. For example, the warning signal may be a warning sound warning theft in a loud sound in the surroundings, or may a visually flashing red light like a warning light. In addition, a signal may be generated in various forms so that a user may recognize a fact of theft. Here, a reference time may be variously set according to the environment in which the electric bicycle 200 is used, and may be selected by a user as needed.

With such a configuration, the electric bicycle theft detection system 101 according to the first embodiment of the present disclosure may detect theft of the electric bicycle 200 and promptly notify the user of the fact that theft has occurred.

In this way, by notifying the user of theft detection information that the electric bicycle 200 is suspected of being stolen, it is possible to respond immediately when the user is nearby, and helps to quickly report theft even if the user cannot directly check the theft detection information.

In addition, the user is notified of a dangerous situation and may optionally sound a warning alarm in the electric bicycle 200.

Figure 3:
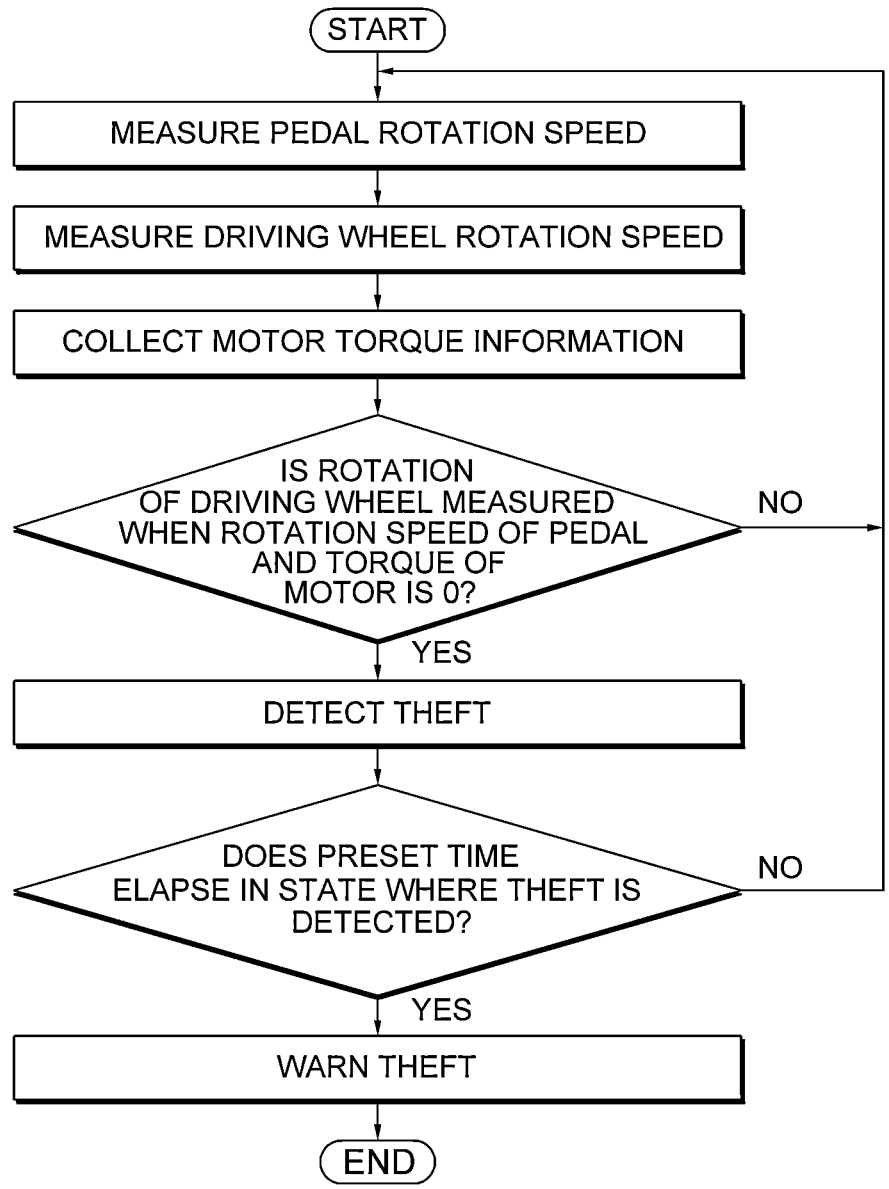
FIG. 3 is a flowchart illustrating an electric bicycle theft detection method using the electric bicycle theft detection system according to the first embodiment of the present disclosure.
Figure 4:
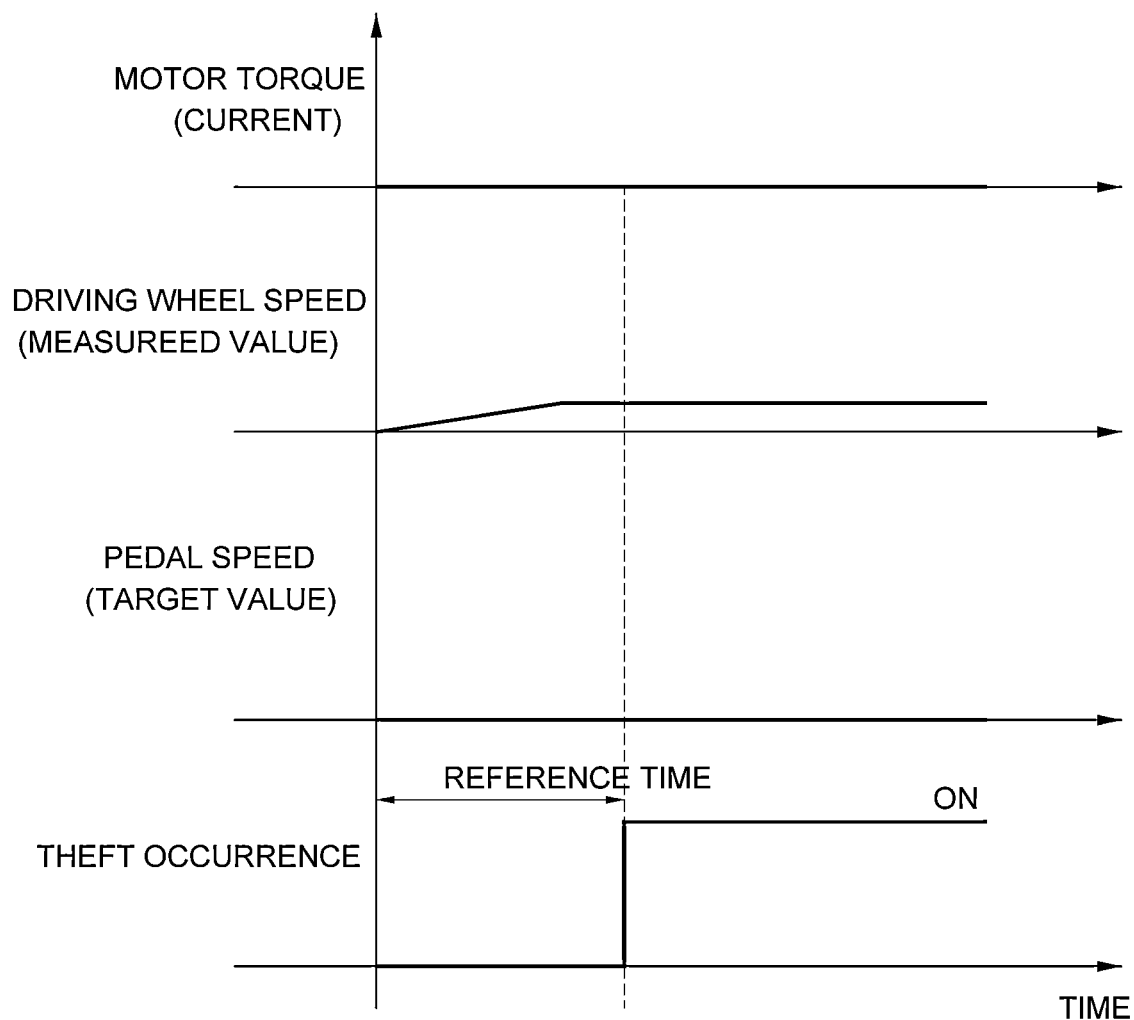
FIG. 4 is a graph for describing the electric bicycle theft detection method in FIG. 3.

Hereinafter, an electric bicycle theft detection method using the electric bicycle theft detection system 101 according to the first embodiment of the present disclosure will be described in detail with reference to FIGS. 3 and 4.

First, the rotation speed of the pedal 220, the rotation speed of the driving wheel 240, and the torque of the motor 250 may be measured. Here, the torque of the motor 250 may be measured using a torque sensor or calculated using an applied current.

Next, theft is detected based on the rotation speed of the pedal 220, the rotation speed of the driving wheel 240, and the torque of the motor 250. The determination of whether the theft is detected is made by the control device 270. Specifically, in the step of detecting theft, the rotation of the driving wheel 240 is measured while the rotation speed of the pedal 220 and the torque of the motor 250 are 0, the theft may be detected.

Next, when theft is detected, a warning signal is generated to warn a user. Specifically, in the step of warning the user, when a preset reference time elapses in a state in which theft is detected, a warning signal may be generated. The warning signal may be performed by the user interface device 210 under the control of the control device 270. The user interface device 210 may generate a warning sound warning the theft with a loud sound or a warning signal in various forms to enable a user to recognize the fact that the theft has occurred.

As such, the reason for setting a delay time before warning a user after theft is detected is that the driving wheel 240 of the electric bicycle 200 may temporarily rotate even in a non-theft situation, so it is possible to filter and remove erroneous determination according to this situation. Accordingly, it is possible to prevent the frequent warning of theft to the user in unnecessary situations.

As described above, according to the electric bicycle theft detection method, it is possible to detect the theft of the electric bicycle 200 and promptly notify the user of the fact that theft has occurred.

Hereinafter, an electric bicycle theft detection system 102 according to a second embodiment of the present disclosure will be described with reference to FIG. 5.

Figure 5:
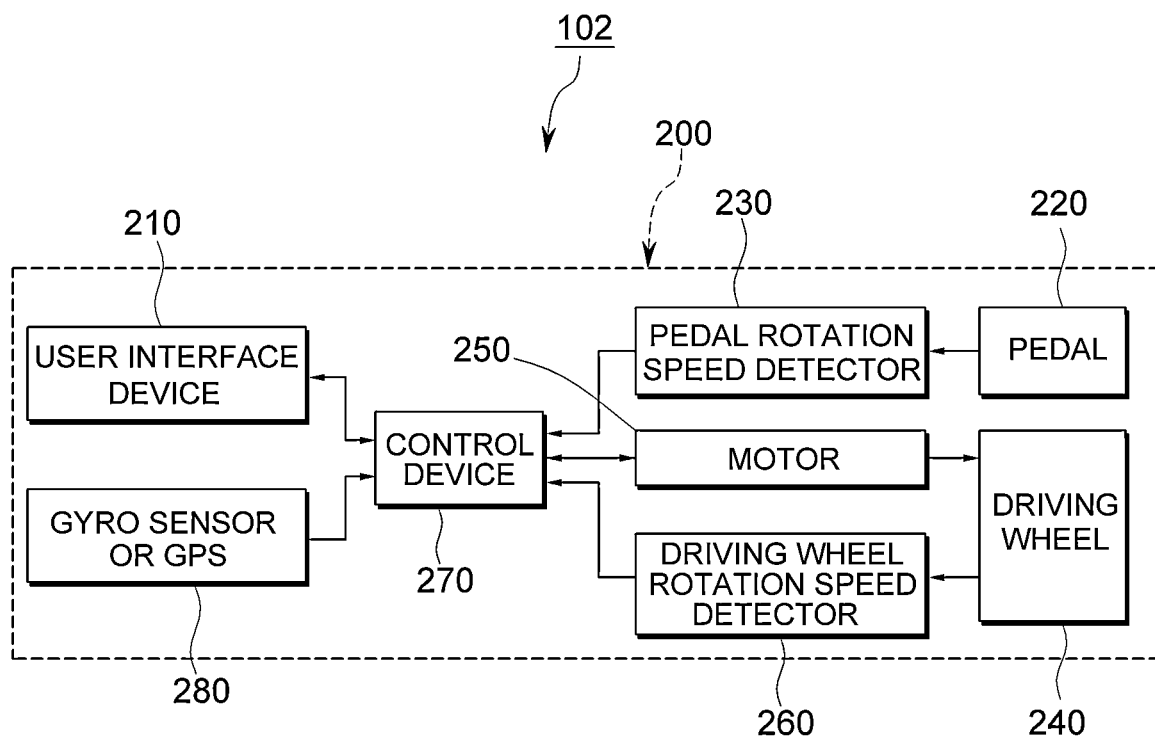
FIG. 5 is a configuration diagram illustrating an electric bicycle theft detection system according to a second embodiment of the present disclosure.

As illustrated in FIG. 5, the electric bicycle theft detection system 102 according to the second embodiment of the present disclosure may further include at least one of a gyro sensor 280 for detecting the operation state and a global positioning system (GPS) for tracking a location. In addition, the control device 270 may detect theft by reflecting on information provided by the gyro sensor 280 or the global positioning system.

Specifically, when the gyro sensor 280 detects an operation or the global positioning system (GPS) detects location movement while the rotation speed of the pedal 220, the rotation speed of the driving wheel 240, and the torque of the motor 250 are 0, the control device 270 may detect theft.

In addition, the control device 270 may control the user interface device 210 to generate a warning signal when a preset reference time elapses in a state in which theft is detected. Here, the reference time may be variously set according to the environment in which the electric bicycle 200 is used, and may be selected by a user as needed.

Figure 6:
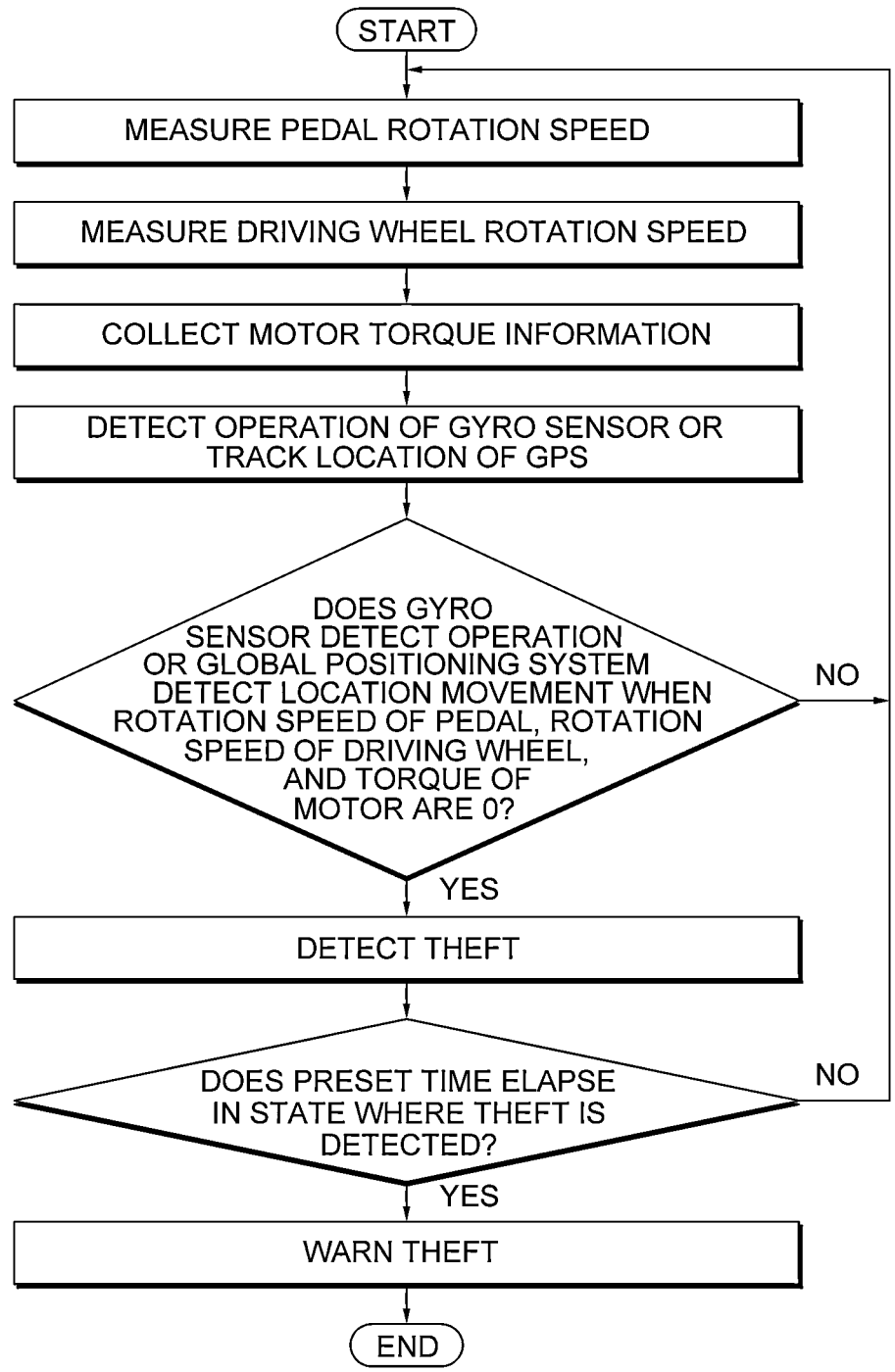
FIG. 6 is a flowchart illustrating an electric bicycle theft detection method using the electric bicycle theft detection system according to the second embodiment of the present disclosure.
Figure 7:
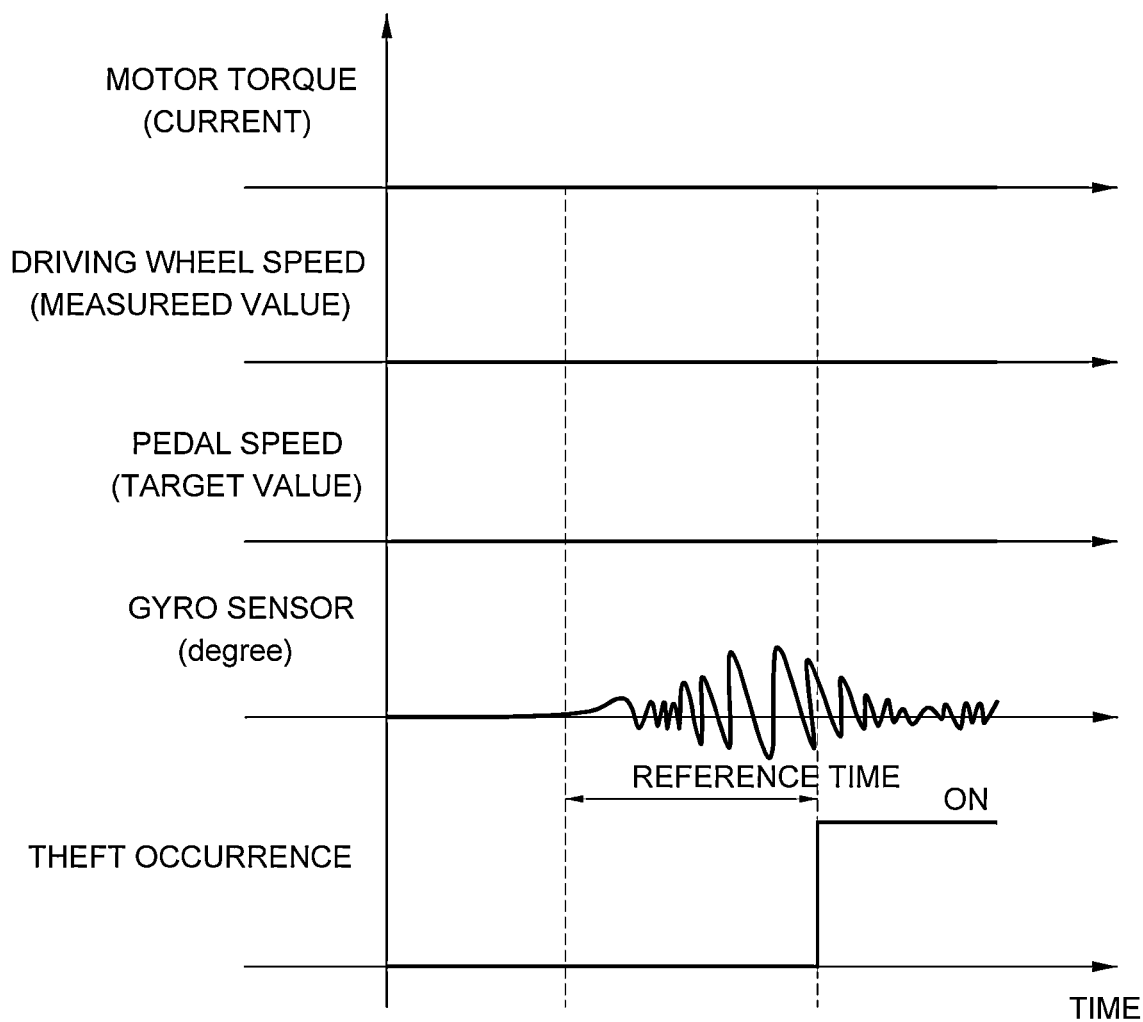
FIG. 7 is a graph for describing the electric bicycle theft detection method in FIG. 6.

With such a configuration, the electric bicycle theft detection system 102 according to the second embodiment of the present disclosure may also detect the theft of the electric bicycle 200 and promptly notify the user of the fact that theft has occurred. Hereinafter, the electric bicycle theft detection method using the electric bicycle theft detection system 102 according to the second embodiment of the present disclosure will be described in detail with reference to FIGS. 6 and 7.

First, the rotation speed of the pedal 220, the rotation speed of the driving wheel 240, and the torque of the motor 250 may be measured. Here, the torque of the motor 250 may be measured using a torque sensor or calculated using an applied current.

In addition, an operation is sensed by the gyro sensor 280 or a location is tracked by the global positioning system (GPS).

Next, theft is detected based on the rotation speed of the pedal 220, the rotation speed of the driving wheel 240, the torque of the motor 250, and the information provided by the gyro sensor 280 or the global positioning system (GPS). The determination of whether the theft is detected is made by the control device 270. Specifically, in the step of detecting the theft, when the gyro sensor 280 detects the operation or the global positioning system (GPS) detects the location movement while the rotation speed of the pedal 220, the torque of the motor 250, and the rotation speed of the driving wheel 240 are 0, the theft may be detected.

Next, when theft is detected, a warning signal is generated to warn a user. Specifically, in the step of warning the user, when a preset reference time elapses in a state in which theft is detected, a warning signal may be generated. The warning signal may be performed by the user interface device 210 under the control of the control device 270. The user interface device 210 may generate a warning sound warning the theft with a loud sound or a warning signal in various forms to enable a user to recognize the fact that the theft has occurred.

Accordingly, it is possible to detect the theft of the electric bicycle 200 and promptly notify the user of the fact that the theft has occurred.

As described above, the electric bicycle theft detection method according to the first embodiment and the electric bicycle theft detection method according to the second embodiment may be selectively applied according to the type and performance of the electric bicycle 200, and may be selected by the user according to the environment in which the electric bicycle 200 is used.

Hereinafter, an electric bicycle theft detection system 103 according to a third embodiment of the present disclosure will be described with reference to FIG. 8.

Figure 8:
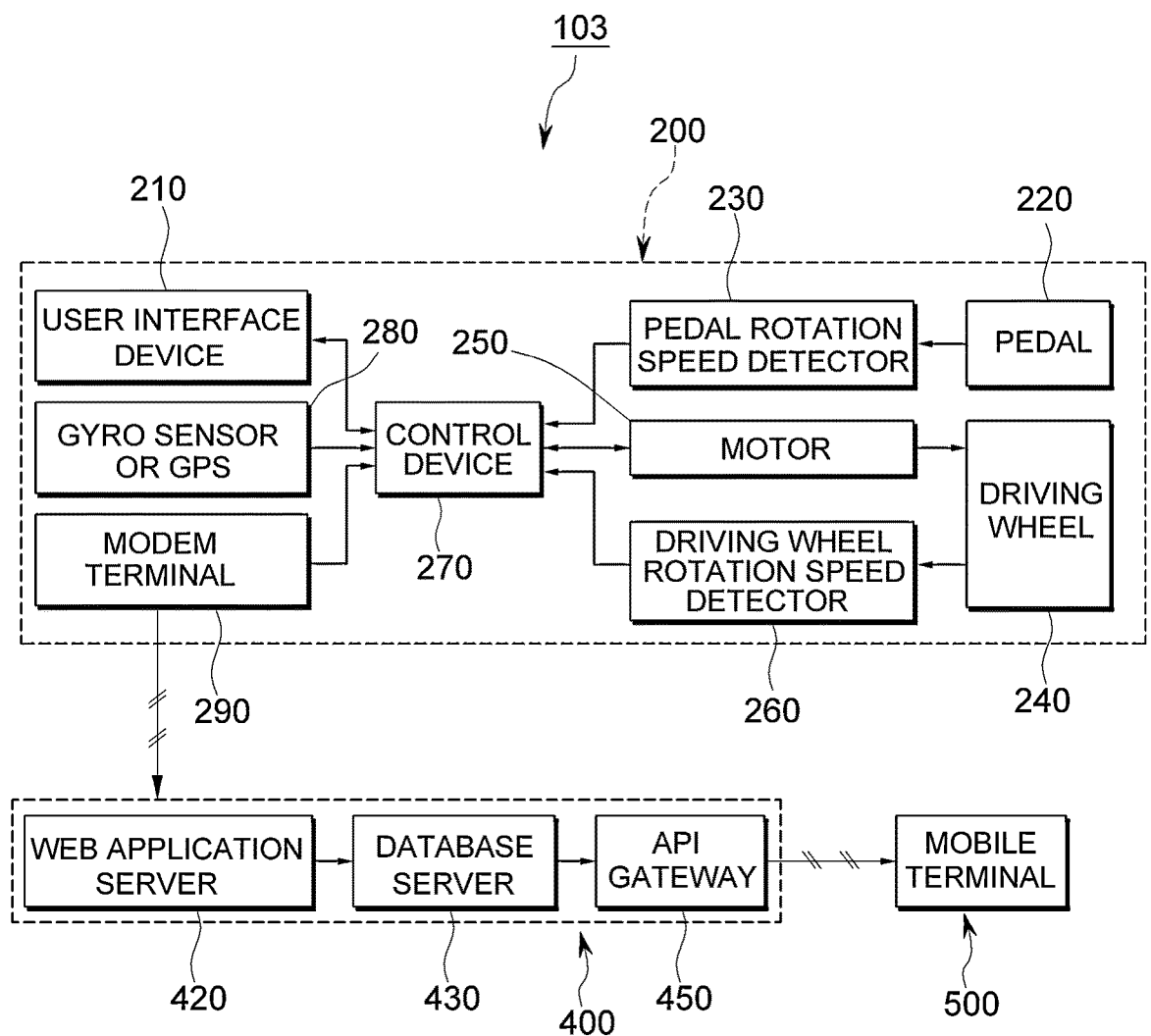
FIG. 8 is a configuration diagram illustrating an electric bicycle theft detection system according to a third embodiment of the present disclosure.

As illustrated in FIG. 8, the electric bicycle theft detection system 103 according to the third embodiment of the present disclosure may include an electric bicycle 200, a cloud service 400, and a mobile terminal 500.

The electric bicycle 200 includes a pedal 220 that generates rotational energy, a pedal rotation speed detector 230 that measures the rotation speed of the pedal 220, a driving wheel 240 that rotates by receiving power, a motor 250 that rotates the driving wheel 240, a driving wheel rotation speed detector 260 that measures the rotation speed of the driving wheel 240, a control device 270 that detects theft based on the rotation speed of the pedal 220, the torque of the motor 250, and the rotation speed of the driving wheel 240, and a modem terminal 290 that transmits theft detection information provided by the control device 270.

In addition, the electric bicycle 200 may further include at least one of a gyro sensor 280 for detecting an operation state and a global positioning system (GPS) for tracking a location.

When the electric bicycle 200 further includes the gyro sensor 280 or the global positioning system (GPS), the control device 270 may detect theft by reflecting the information provided by the gyro sensor 280 or the global positioning system (GPS).

In addition, the electric bicycle 200 may further include a user interface device 210 that generates a warning signal when the control device 270 detects theft.

The mobile terminal 500 manages the electric bicycle 200, and may be provided with an application for displaying theft detection information when theft is detected and generating a warning signal. That is, even if a user is far away from the electric bicycle 200, the theft detection information of the electric bicycle 200 may be checked through the mobile terminal 500.

The cloud service 400 may receive information transmitted by the modem terminal 290 of the electric bicycle 200, update stored information, and transmit the updated information to the mobile terminal 500.

Specifically, the cloud service 400 may include a web application server 420 that communicates with the modem terminal 290 of the electric bicycle 200, a database server 430 that integrates and stores information collected by the web application server 420, and an application programming interface (API) gateway 450 that transmits information stored in the database server 430 to the mobile terminal 500.

In the third embodiment of the present disclosure, the control device 270 of the electric bicycle 200 may detect theft when the rotation of the driving wheel 240 is measured while the rotation speed of the pedal 220 and the torque of the motor 250 are 0.

In addition, when the electric bicycle 200 includes the gyro sensor 280 or the global positioning system (GPS), the control device 270 may detect theft when the gyro sensor 280 detects the operation or the global positioning system (GPS) detects the location movement while the rotation speed of the pedal 220, the rotation speed of the driving wheel 240, and the torque of the motor 250 are 0.

In addition, when a preset reference time elapses in a state in which theft is detected, the control device 270 may transmit the theft detection information to the cloud service 400 through the modem terminal 290.

The cloud service 400 may transmit the received theft detection information to the mobile terminal 500 to notify or warn the user of the information.

In addition, in the third embodiment of the present disclosure, the user interface device 210 of the electric bicycle 200 may display the theft detection information provided by the control device 270 or generate the warning signal.

With such a configuration, the electric bicycle theft detection system 103 according to the third embodiment of the present disclosure may detect the theft of the electric bicycle 200 and promptly notify the user of the fact that theft has occurred.

In particular, according to the third embodiment of the present disclosure, the user may remotely check the theft detection information through the mobile terminal 500 even in a state far away from the electric bicycle 200.

Although the embodiments of the present invention have been described with reference to the accompanying drawings, those skilled in the art will appreciate that various modifications and alterations may be made without departing from the spirit or essential feature of the present invention.

Therefore, the embodiments described above are to be understood as illustrative and not restrictive in all respects, the scope of the present disclosure is indicated by the detailed description and the claims to be described later, and all changes or modifications derived from the meaning and scope of the claims and their equivalents should be understood as being included in the scope of the present disclosure.

[Detailed Description of Main Elements]

| | |
|---|---|
| 10: Front frame | 20: Middle frame |
| 30: Rear frame | 12: Front wheel |
| 14: Handle stay | 16: Handlebar |
| 17: Handle grip | 21: Generator |
| 23: Battery | 24: Saddle |
| 25: Saddle tube | 26: Sheet tube |
| 102, 102: Tire management system of electric bicycle | |
| 200: Electric bicycle | |
| 210: User interface device | |
| 220: Pedal | |
| 230: Pedal rotation speed detector | |
| 240: Driving wheel, rear wheel | |
| 250: Motor | |
| 260: Driving wheel rotation speed detector | |
| 270: Control device | |
| 280: Gyro sensor | |
| 290: Modem terminal | |
| 400: Cloud service | |
| 420 Web application server | |
| 430: Data base server | |
| 450: Application programming interface gateway | |
| 500: Mobile terminal | |

What is claimed is:

1. An electric bicycle theft detection system, comprising:
a pedal configured to generate rotational energy;
a pedal rotation speed detector configured to measure a rotation speed of the pedal;
a driving wheel configured to rotate by receiving power;
a motor configured to rotate the driving wheel;
a driving wheel rotation speed detector configured to measure the rotation speed of the driving wheel;
a control device configured to detect theft based on the rotation speed of the pedal, a torque of the motor, and the rotation speed of the driving wheel; and
a user interface device configured to generate a warning signal when the control device detects the theft.

2. The electric bicycle theft detection system of claim 1, wherein the control device detects the theft when the rotation of the driving wheel is measured while the rotation speed of the pedal and the torque of the motor are 0.

3. The electric bicycle theft detection system of claim 1, further comprising:
at least one of a gyro sensor detecting an operation state and a global positioning system (GPS) tracking a position,
wherein the control device detects the theft by reflecting on information provided by the gyro sensor or the global positioning system.

4. The electric bicycle theft detection system of claim 3, wherein the control device detects the theft when the gyro sensor detects an operation or the global positioning system detects a location movement while the rotation speed of the pedal, the rotation speed of the driving wheel, and the torque of the motor are 0.

5. The electric bicycle theft detection system of claim 2, wherein the control device controls the user interface device to generate a warning signal when a preset reference time elapses in a state in which the theft is detected.

6. An electric bicycle theft detection system, comprising:
an electric bicycle including a pedal configured to generate rotational energy, a pedal rotation speed detector configured to measure a rotation speed of the pedal, a driving wheel configured to rotate by receiving power, a motor configured to rotate the driving wheel, a driving wheel rotation speed detector configured to measure the rotation speed of the driving wheel, a control device configured to detect theft based on the rotation speed of the pedal, a torque of the motor, and the rotation speed of the driving wheel, and a modem terminal configured to transmit theft detection information provided by the control device;
a mobile terminal installed with an application for managing the electric bicycle and displaying the theft detection information; and
a cloud service configured to receive the theft detection information transmitted from the modem terminal, update stored information, and transmit the updated information to the mobile terminal.

7. The electric bicycle theft detection system of claim 6, wherein the cloud server includes:
a web application server configured to communicate with the modem terminal of the electric bicycle;
a database server configured to integrate and store information collected by the web application server; and
an application programming interface gateway configured to transmit information stored in the database server to the mobile terminal.

8. The electric bicycle theft detection system of claim 6, wherein the control device detects the theft when the rotation of the driving wheel is measured while the rotation speed of the pedal and the torque of the motor are 0.

9. The electric bicycle theft detection system of claim 6, further comprising:
at least one of a gyro sensor detecting an operation state and a global positioning system (GPS) tracking a position,
wherein the control device detects the theft by reflecting on information provided by the gyro sensor or the global positioning system.

10. The electric bicycle theft detection system of claim 9, wherein the control device detects the theft when the gyro sensor detects an operation or the global positioning system detects a location movement while the rotation speed of the pedal, the rotation speed of the driving wheel, and the torque of the motor are 0.

11. The electric bicycle theft detection system of claim 8, wherein the control device transmits the theft detection information to the cloud service through the modem terminal when a preset reference time elapses in a state in which the theft is detected.

12. The electric bicycle theft detection system of claim 6, wherein the electric bicycle further includes a user interface device for generating a warning signal when the control device detects the theft.

13. An electric bicycle theft detection method, comprising:
   measuring a rotation speed of a pedal:
   measuring a rotation speed of a driving wheel;
   measuring a torque of a motor rotating the driving wheel;
   detecting theft based on the rotation speed of the pedal, the rotation speed of the driving wheel, and the torque of the motor; and
   generating a warning signal to warn a user when the theft is detected.

14. The electric bicycle theft detection method of claim 13, wherein in the detecting of the theft, the theft is detected when the rotation of the driving wheel is measured while the rotation speed of the pedal and the torque of the motor are 0.

15. The electric bicycle theft detection method of claim 13, further comprising:
   detecting an operating through a gyro sensor or tracking a location through a global positioning system (GPS),
   wherein the theft is detected by reflecting on information provided by the gyro sensor or the global positioning system.

16. The electric bicycle theft detection method of claim 15, wherein in the detecting of the theft, the theft is detected when the gyro sensor detects an operation or the global positioning system detects a location movement while the rotation speed of the pedal, the rotation speed of the driving wheel, and the torque of the motor are 0.

17. The electric bicycle theft detection method of claim 14, wherein in the warning of the user, a warning signal is generated when a preset reference time elapses in a state in which the theft is detected.

\* \* \* \* \*